April 21, 1970  B. M. BAKER  3,508,238
INTRUSION DETECTION SYSTEM
Filed July 18, 1966
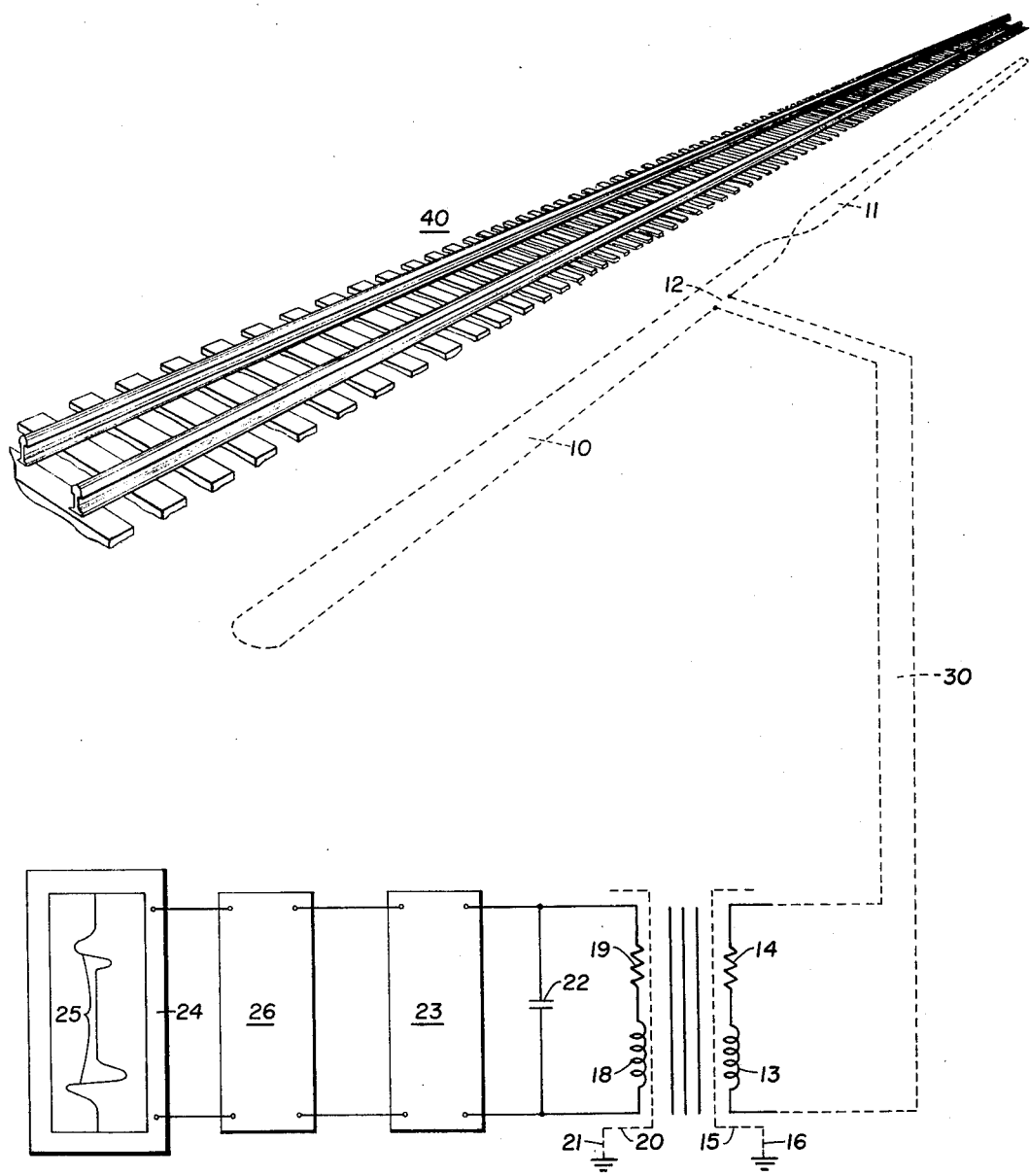
INVENTOR
BUFORD M. BAKER
ATTORNEY

3,508,238
INTRUSION DETECTION SYSTEM
Buford M. Baker, Dallas, Tex., assignor to Texas Instruments Incorporated, Dallas, Tex., a corporation of Delaware
Filed July 18, 1966, Ser. No. 566,041
Int. Cl. G08b *13/26;* G08g *1/00*
U.S. Cl. 340—258             6 Claims

ABSTRACT OF THE DISCLOSURE

Detection of the entry into a given area of the earth's surface of any magnetic body may be accomplished by a detecting system which utilizes the earth's magnetic field and changes therein anywhere in a large area. A pair of alike loops are located immediately beneath the earth's surface where intrusion of a magnetic body is to be detected. A reactance amplifier is provided for amplifying the signals from the loops which are connected in series opposition to the primary winding of the transformer for coupling said loops to the reactance amplifier.

---

This invention relates to an intrusion detection system and more particularly to a low-noise detecting and amplifying system for sensing changes in the character of the magnetic field at the earth's surface produced by intrusion of a magnetic body.

Detection of the entry into a given area of the earth's surface of any magnetic body may be accomplished in any one of several different ways if the path or the localized area in which the body may move is known. However, for surveillance of large areas such as may be desirable in detecting possible impending sabotage, for example, as on a railroad or the like, the problem becomes more difficult. Video surveillance systems may be employed under conditions which are appropriate. Areal system simplification is desirable so long as reliability is maintained.

The present invention is directed to a presence-detecting system which utilizes the earth's magnetic field and changes therein anywhere in a large area for sensing the intrusion of a body having magnetic character such as to produce a local change in the earth's magnetic field. The system is advantageous in that the sensing loop, amplifier and electrical conductors may be buried under the surface of the earth and thus not easily discovered. Further, the sensing system is passive. It produces no signal which might be used to locate and disable it. It is insensitive to animals or persons crossing the loop unless ferromagnetic material is involved. Thus alarms will be sounded only when intrusion is made by persons carrying arms or tools which may involve sabotage intent.

More particularly, in accordance with the present invention, there is provided a pair of alike loops located immediately beneath the earth's surface. The loops normally sense equal but spaced apart components of that portion of the magnetic field characterizing the earth's surface. A reactance amplifier is provided for amplifying the signals from the loops. A transformer is used having a core of magnetic material with a primary winding and a secondary winding. The loops are connected in series opposition and to the primary transformer winding. The secondary winding is connected to the amplifier where the secondary winding includes means to resonate the same at a frequency which is very low compared to power line frequencies. Electrostatic shields are provided in the transformer for shielding the windings from each other and from the core to eliminate electrostatic coupling that would otherwise exist between the windings.

For a more complete understanding of the present invention and for further objects and advantages thereof, reference may now be had to the following description taken in conjunction with the accompanying drawing which diagrammatically illustrates one embodiment of the present invention.

Referring now to the drawing, a loop of insulated wire is buried a few inches beneath the surface of the earth. The loop of wire is in the form of an elongated figure eight having effectively two loops 10 and 11 which, so far as terminals 12 are concerned, are connected in series opposition. In accordance with the present invention, the loops 10 and 11 would be elongated loops of length of one thousand feet or more and would be formed using a single length of relatively large insulated copper wire as, for example, 4, 6, or 8 gauge wire. The total resistance of the loop preferably will not exceed one ohm. The terminals 12 of the loop are connected to the primary winding 13 of an input transformer, the resistance of which is represented by the resistance 14. The primary winding is provided with an electrostatic shield 15 which is connected to ground terminal 16. The magnetic core 17 of the transformer is also shielded from the primary and secondary windings. The secondary winding 18, having effective resistance 19, is shielded from winding 13 and from core 17 by shield 20 which is connected to ground terminal 21. A condenser 22 is connected across the secondary winding 18. A low noise reactance amplifier 23 is connected to the secondary winding and provides an output signal which is connected to a conventional amplifier 26 containing filters to attenuate frequencies above 9 c.p.s. and to greatly attenuate frequencies around 50 to 60 c.p.s. Amplifier 26 provides an output signal which is applied to a chart recorder 24.

It is desirable to indicate and/or record the entry or intrusion into the area spanned by loops 10 and 11 of any material of magnetic character which will change the earth's field flux linked to the loops 10 and 11. As indicated on the chart recorder 24, the passage of a small ferromagnetic object at uniform velocity across the loop at any point is indicated by a complete voltage cycle as the object passes over each side of the loop such as indicated by 25 on the chart. The chart may be driven as a function of time so that a surveillance record will be maintained of the area spanned by the loops 10 and 11. These signal pulses may also be used to sound an alarm, light a warning light, or actuate other equipment, such as radios, as may be desired, depending upon the tactics employed.

For such a systtm successfully to operate, it must provide low resistance loops wherein the thermal agitation noise produced therein is low relative to the amplitude of signals that will be produced. Time variations of the earth's natural magnetic field will generate voltages in each half of the loops equal in amplitude but opposite in phase and thus will cancel each other with the resulting zero voltage appearing at the loop terminals. However, the movement of the body of ferromagnetic material near or across either loop 10 or 11 will cause a disturbance of the earth's field with the resulting voltage appearing between the loop terminals. Thus, the loops can be of great length to detect over a considerable area the movement of persons or vehicles near the loop, where movement of magnetic material is involved, such as in military armed personnel.

Particularly, the system will be suitable for detecting impending sabotage of a railroad 40 and the like, where long lines are to be monitored.

The voltage generated in the loop of wire may be expressed as:

$$E = N \frac{d\phi}{dt} \times 10^{-8} \quad (1)$$

where:
E is expressed in volts
N = number of turns of wire
$\frac{d\phi}{dt}$ is expressed in $\frac{\text{maxwells}}{\text{sec.}}$ The ultimate limitation of the smallest signal that can be detected in loops 10 and 11 is the thermal noise due to the resistance of the wire in the loop. The thermal noise of any resistance may be expressed as:

$$E^2 = 4kTR(f_2 - f_1) \quad (2)$$

where:
E = voltage (RMS)
k = Boltzmann's constant = $1.374 \times 10^{-23}$ joule/° K.
T = temperature in ° K
R = resistance in ohms
$(f_2 - f_1)$ = band width in cps.

For a resistance of one ohm, a bandwidth of 9 cycles per second and a temperature of 20° C., the thermal noise would be $3.87 \times 10^{-10}$ volts RMS. Peak noise voltages will occur at about four times the value or at about $1.5 \times 10^{-9}$. Thus, for a single turn loop, a rate of change of magnetic flux equal to the thermal agitation noise is:

$$\frac{d\phi}{dt} \times 10^{-8} = 1.5 \times 10^{-9} \quad (3)$$

or $$\frac{d\phi}{dt} = 0.15 \frac{\text{maxwells}}{\text{sec.}} \quad (4)$$

Only a very small mass of ferromagnetic material moving at very low velocity is sufficient to cause this rate of change.

In order to detect the low voltage as above indicated, the amplifier 23 must have an equivalent input noise of no greater than $1.5 \times 10^{-9}$ volts. Further, it must be recognized that in many areas, there are large magnetic and electrostatic fields at 60 cps. and 50 cps. due to power lines, transformers, etc. Such power installations may generate voltages across terminals 12 of the loop as well as between the terminals and ground. Thus the amplifying system must effectively handle signal voltages of $10^{-8}$ volts or less while rejecting power frequency voltages of several millivolts across terminals 12 and a common mode voltages, between terminals and ground, as high as 50 volts or more.

The system shown has been found to be suitable for this purpose and employs, as amplifier 23, a reactance amplifier of tht type manufactured and sold by Texas Instruments Incorporated and identified as amplifier No. RA-2 (Patent Office Ser. No. 457,776). This amplifier has the lowest equivalent input noise power of any known amplifier. It has a noise equivalent to a 15,000 ohm resistor while having an effective input impedance of approximately 500 megohms. In this embodiment, the reactance amplifier 23 normally has a voltage gain of 2000. Following amplifier 23 is a conventional amplifier 26 with high frequency cut-off filters attenuating frequencies higher than 9 cycles per second. The voltage gain of the amplifier 26 is 500 giving an overall system gain of one million and a frequency band pass of 0.25 cps. to 9.0 cps. Thus, with such an amplifier system, the principal area of interest becomes the transfer means for applying signals from the terminals 12 to the amplifier 23. In one embodiment of the invention, the transformer employed was provided such that the primary circuit had one-half the resistance of the loop resistance appearing at terminals 12, i.e., one-half ohm. The secondary winding resistance was 16,000 ohms. The thermal noise generated in the secondary 18 of the transformer will be that of the resistance 19 of the secondary in series with a 15,000 ohm equivalent amplifier noise. The noise voltage generated in the primary circuit is transformed in the secondary winding by the factor $$\left(\frac{L_s}{L_p}\right)^{1/2}$$

Thus, the entire system at the input of the amplifier 23 may be considered to be a single equivalent noise generating resistor. The noise resistor value referred to the input loop terminals is thus expressed by the equation:

$$R_{(\text{input})} = 1\Omega + R_p + \frac{L_p}{L_s} \times (1500\Omega + R_s) \quad (5)$$

From Equation 5 it will readily be seen that the limiting value of the input resistance is one ohm (the loop resistance) and that this value may be approached as closely as desired by making the resistance 14 and resistance 19 and the ratio $L_p/L_s$ small. Stated otherwise, this may be approached by making the winding resistance low and the voltage step-up ratio high. From a practical standpoint this means that the larger the transformer employed, the less noise that will be added to the loop noise.

It was found that electrostatic coupling would transfer unwanted signals (noise) from the loop to the reactance amplifier. When the loop is installed near a high voltage AC power line, AC voltage is electrostatically induced in the loop. Very little voltage may exist between the two loop terminals due to the cancellation effect of the two loop halves. However, large AC voltages may exist between both loop terminals and ground. Shielding prevents this common mode voltage from being transferred to the amplifier. Common mode rejection in excess of $10^8$ was obtained and is necessary in some loop installations.

In accordance with the present invention, the primary winding was completely shielded by shield 15 from the secondary winding. The secondary winding was completely shielded from the core and from the primary winding by shield 20. As a result, a common mode of rejection of approximately $10^8$ was obtained.

The amplifier 23 and the transformer 17, in the embodiment above described, were encased in a liquid-tight housing and were buried along with the loops 10 and 11 so that the leads 30, shown dotted in FIGURE 1, were actually nonexistent. Minimizing lead length further reduced the noise problems. The lines running between amplifiers 23 and 26 may then be elongated lines extending to a monitoring location. The capacitor 22 was chosen such as to resonate the input to the amplifier 23 at one cycle per second for high attenuation of frequencies above approximately 9 cps. Thus, by providing a transformer having a large magnetic core and a low resistance primary winding and a low resistance secondary winding with the ratio of the inductances of the secondary winding to the primary winding equal to approximately 30,000 with the windings shielded from each other and from the core, the transfer of signals from loop terminal 12 to amplifier 23 was optimized. The system was thus capable of detecting intrusion of small magnetic bodies into the area spanned by the loops.

What is claimed is:
1. An intrusion detecting system which comprises:
 (a) a pair of alike passive conductive loops buried near the earth's surface normally to sense changes in normally equal but spaced apart components of the magnetic field characterizing the surface of the earth,
 (b) a reactance amplifier for amplifying signals from said loops,
 (c) a transformer having a core of magnetic material, a primary winding and a secondary winding where the ratio of the inductance of the secondary winding inductance to primary winding inductance is greater than the equivalent noise resistance of said amplifier

(d) means to connect said loops in series opposition and to said primary winding, (e) means for connecting said secondary winding to said amplifier including means to resonate said secondary winding at a frequency very low compared with power frequencies, and (f) electrostatic shield means to shield said primary winding from said secondary winding and from said core and to shield said secondary winding from said primary winding and from said core.

2. The combination set forth in claim 1 wherein said loops are positioned in a horizontal plane immediately beneath the earth's surface and wherein said transformer and said reactance amplifier are located immediately adjacent to the terminals of said loops.

3. The combination set forth in claim 2 in which additional amplifying means and indicating means are located remote from the location of said loops.

4. The combination set forth in claim 1 in which said loops were each formed of a single turn of insulated, low resistance wire.

5. The combination set forth in claim 1 in which the resistance of said loops connected in series is of the order of 1 ohm.

6. The combination set forth in claim 1 in which a single length of wire is buried in the form of a horizontally disposed elongated figure eight and wherein said transformer and said amplifier are located at and connected to the ends of said wire.

References Cited

UNITED STATES PATENTS

| 2,212,986 | 8/1940 | Horni | 340—38 |
| 2,537,298 | 1/1951 | Baughman. | |
| 2,685,680 | 8/1954 | Williams | 340—38 |

JOHN W. CALDWELL, Primary Examiner

D. L. TRAFTON, Assistant Examiner

U.S. Cl. X.R.

340—38